(12) United States Patent
Li

(10) Patent No.: US 11,016,511 B2
(45) Date of Patent: May 25, 2021

(54) TRACKING AND IDENTIFICATION METHOD AND SYSTEM AND AIRCRAFT

(71) Applicant: AUTEL ROBOTICS CO., LTD., Guangdong (CN)

(72) Inventor: Zuoguang Li, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 251 days.

(21) Appl. No.: 16/193,354

(22) Filed: Nov. 16, 2018

(65) Prior Publication Data
US 2019/0086939 A1    Mar. 21, 2019

Related U.S. Application Data

(63) Continuation of application No. PCT/CN2016/094600, filed on Aug. 11, 2016.

(51) Int. Cl.
*G05D 1/12* (2006.01)
*B64D 47/08* (2006.01)
(Continued)

(52) U.S. Cl.
CPC .............. *G05D 1/12* (2013.01); *B64D 47/08* (2013.01); *G05D 1/0027* (2013.01); *G05D 1/042* (2013.01)

(58) Field of Classification Search
CPC ........................................................ G05D 1/12
See application file for complete search history.

(56) References Cited

U.S. PATENT DOCUMENTS

2018/0181129 A1* 6/2018 Li ................... G06K 9/00208
2018/0284777 A1* 10/2018 Li ............................ G06K 9/66
(Continued)

FOREIGN PATENT DOCUMENTS

CN    102419598 A    4/2012
CN    102768518 A    11/2012
(Continued)

OTHER PUBLICATIONS

International Search Report and Written Opinion dated May 11, 2017; PCT/CN2016/094600.

*Primary Examiner* — Michael A Berns

(57) ABSTRACT

Disclosed are a tracking and identification method and system and an aircraft. The method includes: obtaining, by a first aircraft, a first feature parameter of a target object; if image data captured by the first aircraft does not match the first feature parameter, adjusting the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object. The first aircraft in the predetermined high-altitude area and the second aircraft in the predetermined low-altitude area in embodiments of the present invention form high-low altitude cooperation and are respectively configured to track and identify the target object, thereby implementing transfer of location information between two or more aircrafts as well as tracking and identifying the target object.

8 Claims, 3 Drawing Sheets

(51) Int. Cl.
   *G05D 1/00*   (2006.01)
   *G05D 1/04*   (2006.01)

(56) References Cited

U.S. PATENT DOCUMENTS

| | | | |
|---|---|---|---|
| 2019/0086939 A1* | 3/2019 | Li | B64D 47/08 |
| 2019/0253626 A1* | 8/2019 | Li | G06T 7/292 |
| 2020/0097721 A1* | 3/2020 | Yakimenko | G06K 9/00637 |

FOREIGN PATENT DOCUMENTS

| | | |
|---|---|---|
| CN | 105242684 A | 1/2016 |
| CN | 105447459 A | 3/2016 |
| CN | 105763423 A | 7/2016 |
| KR | 20150059365 A | 6/2015 |
| KR | 101539865 B1 * | 7/2015 |

\* cited by examiner

TRACKING AND IDENTIFICATION METHOD AND SYSTEM AND AIRCRAFT

CROSS REFERENCE

The present application is a continuation of International Application NO. PCT/CN2016/094600, which is incorporated herein by reference in its entirety.

TECHNICAL FIELD

Embodiments of the present invention relate to the field of aircraft technologies, and in particular, to a tracking and identification method and system and an aircraft.

RELATED ART

With the fast development of technologies, aircrafts are widely applied to fields such as monitoring and estimation of natural disasters, urban planning and municipal administration, and digital earth. In recent years, the aircrafts are gradually popularized in fields such as entertainment selfie taking and extreme sports photographing for identifying and tracking a target object.

In the prior art, when a single aircraft takes a picture of a target object, because of limitations of factors such as pixels of a camera on the aircraft, performance of a processor, and an overall weight, to identify more detail features, a flying height of the aircraft is usually reduced to get close to the target object for photographing.

The inventor finds in a process of implementing the embodiments of the present invention that when an aircraft is excessively close to a target object, because a photographing area of a camera is small, a location of the target object cannot be easily obtained, and the target object can easily get lost. Although the target object can be well positioned and tracked by raising a flying height of the aircraft and getting away from the target object for photographing, it is at the cost of sacrificing more detail features, causing that identification of the target object is not accurate.

SUMMARY

A problem mainly resolved by implementations of the present invention is to provide a tracking and identification method and system and an aircraft, to position, track, and identify a target object.

According to a first aspect, an embodiment of the present invention provides a tracking and identification method, including:

obtaining, by a first aircraft, a first feature parameter of a target object, where the first feature parameter is used to track the target object; and if image data captured by the first aircraft does not match the first feature parameter, adjusting the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

Optionally, if the image data captured by the first aircraft matches the first feature parameter, the method further includes:

setting the first aircraft in the predetermined high-altitude area relative to the target object.

Optionally, if the image data captured by the first aircraft matches the first feature parameter, the method further includes:

receiving a location request instruction sent by the second aircraft; and sending location information of the first aircraft or the location information of the target object to the second aircraft.

Optionally, the method further includes:

adjusting, by the second aircraft, the second aircraft to the predetermined low-altitude area relative to the target object according to the location information of the first aircraft or the location information of the target object.

Optionally, the first feature parameter is used to indicate a parameter of an appearance outline of the target object, and the second feature parameter is used to indicate a parameter of a detail feature of the target object.

According to a second aspect, an embodiment of the present invention provides an aircraft, where the aircraft is a first aircraft for tracking a target object, the first aircraft including:

an obtaining unit, configured to obtain a first feature parameter of a target object, where the first feature parameter is used to track the target object; and an adjustment unit, configured to, if image data captured by the first aircraft does not match the first feature parameter, adjust the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

Optionally, if the image data captured by the first aircraft matches the first feature parameter, the first aircraft further includes:

a setting unit, configured to set the first aircraft in the predetermined high-altitude area relative to the target object.

Optionally, if the image data captured by the first aircraft matches the first feature parameter, the first aircraft further includes:

a receiving unit, configured to receive a location request instruction sent by the second aircraft; and a sending unit, configured to send location information of the first aircraft or the location information of the target object to the second aircraft.

According to a third aspect, an embodiment of the present invention provides a tracking and identification system, including at least one first aircraft and at least one second aircraft, where the first aircraft is configured to obtain a first feature parameter of a target object, and the second aircraft is configured to obtain a second feature parameter of the target object, the first feature parameter being used to track the target object, and the second feature parameter being used to identify the target object;

if image data captured by the first aircraft does not match the first feature parameter, the first aircraft is adjusted to a predetermined high-altitude area relative to the target object according to location information of the second aircraft that is sent by the second aircraft or location information of the target object; and the second aircraft is in a predetermined low-altitude area relative to the target object, and image data captured by the second aircraft matches the second feature parameter of the target object.

Optionally, if the image data captured by the first aircraft matches the first feature parameter, a location request instruction sent by the second aircraft is received, and location information of the first aircraft or the location information of the target object is sent to the second aircraft; and the second aircraft adjusts the second aircraft to the predetermined low-altitude area relative to the target object according to the location information of the first aircraft or the location information of the target object.

In the tracking and identification method provided in the embodiments of the present invention, the first aircraft in the predetermined high-altitude area and the second aircraft in the predetermined low-altitude area form high-low altitude cooperation and are respectively configured to track and identify the target object. When the image data captured by the first aircraft does not match the first feature parameter of the target object, the first aircraft is adjusted to the predetermined high-altitude area relative to the target object according to the location information of the second aircraft that is sent by the second aircraft or the location information of the target object, thereby implementing transfer of location information between two or more aircrafts as well as tracking and identifying the target object.

BRIEF DESCRIPTION OF THE DRAWINGS

To more clearly describe technical solutions of the embodiments of the present invention, the following briefly describes accompanying drawings that needs to be used in the embodiments of the present invention. Apparently, the accompanying drawings described below are merely some embodiments of the present invention, and a person of ordinary skill in the art can also obtain other accompanying drawings according to these accompanying drawings without involving any creative effort.

DETAILED DESCRIPTION

To make an objective, technical solutions and advantages of the present invention clearer, the present invention is further described in detail below with reference to the accompanying drawings and embodiments. It should be understood that specific embodiments described herein are merely used to explain the present invention but are not used to limit the present invention.

In addition, technical features used in implementations of the present invention that are described below may be mutually combined provided the technical features do not conflict with each other.

In the embodiments of the present invention, a target object includes but is not limited to a person, an animal and an automobile. For example, features parameters such as a face and/or body outline and/or clothes of a person are obtained. For another example, feature parameters such as a license plate and/or body outline and/or body color of an automobile are obtained. In a process of tracking and identifying the target object based on aircrafts, at least two aircrafts, for example, a first aircraft and a second aircraft that are cooperatively used, need to be cooperatively used. The first aircraft and the second aircraft are both equipped with a camera. The target object may be photographed by using the camera, so that a feature parameter of the target object is obtained. Alternatively, the feature parameter of the target object may be sent to the first aircraft and the second aircraft in a wireless transmission manner by using a server, a smart terminal and the like. For example, the wireless transmission manner is one or more of wireless transmission technologies such as WiFi, Bluetooth, Zigbee and mobile data communications.

The embodiments of the present invention are specifically stated below with reference to the specific accompanying drawings.

Figure 1:
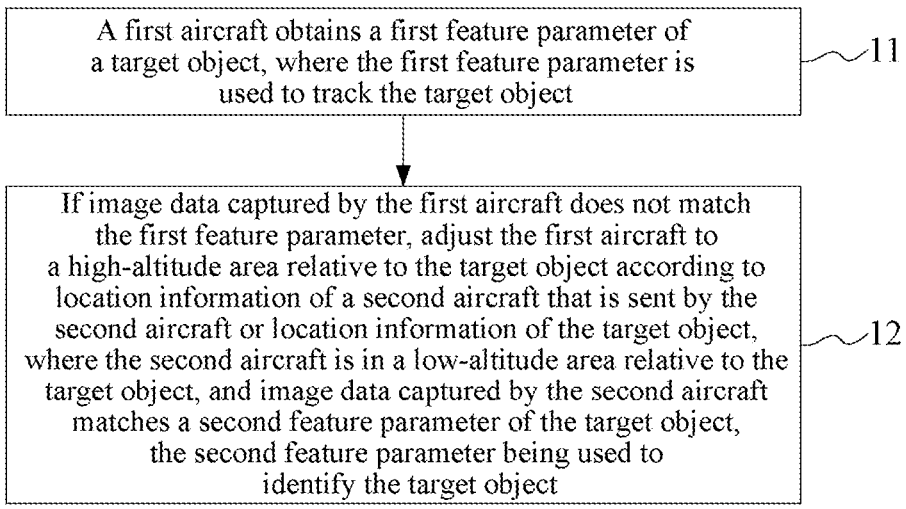
FIG. 1 shows a tracking and identification method according to an embodiment of the present invention.

FIG. 1 shows a tracking and identification method according to an embodiment of the present invention. As shown in FIG. 1, the method includes the following steps.

Step 11: A first aircraft obtains a first feature parameter of a target object, where the first feature parameter is used to track the target object.

In this embodiment of the present invention, considering that the first aircraft obtains the first feature parameter of the target object so as to track the target object, the first feature parameter is mainly used to represent an overall outline of the target object. For example, the first feature parameter is a parameter used to indicate an appearance outline of the target object.

Step 12: If image data captured by the first aircraft does not match the first feature parameter, adjust the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

In actual invention, in at least two situations, the image data captured by the first aircraft does not match the first feature parameter. Specifically, in a first situation, the first aircraft losses the target object, and the target object does not appear in an image captured by the first aircraft. In a second situation, although the target object appears in the image captured by the first aircraft, an overall outline of the target object in the image captured by the first aircraft is excessively vague.

In this embodiment of the present invention, if the image data captured by the first aircraft does not match the first feature parameter, the first aircraft sends a location request instruction, and the second aircraft receives the location request instruction, so that the second aircraft sends location information of the target object according to the location request instruction, and the first aircraft receives the location information of the target object, to adjust the first aircraft to the predetermined high-altitude area relative to the target object according to the location information of the target object. Alternatively, the second aircraft sends the location information of the second aircraft according to the location request instruction, and the first aircraft receives the location information of the second aircraft, to adjust the first aircraft to the predetermined high-altitude area relative to the target object according to the location information of the second aircraft. Specifically, the first aircraft adjusts the first aircraft to the predetermined high-altitude area relative to the target object according to the location information of the second aircraft and the location information of the target object that is determined by the second aircraft.

The first aircraft can photograph the target object in the predetermined high-altitude area, and overall outline of the target object in a captured image is relatively clear, to satisfy that the image data captured by the first aircraft matches the first feature parameter.

It should be noted that the second aircraft obtains a second feature parameter of the target object, where the second feature parameter is used to identify the target object. After the second aircraft receives the location request instruction sent by the first aircraft, a precondition of sending the location information of the target object or the second aircraft according to the location request instruction is that the second aircraft is in the predetermined low-altitude area relative to the target object, and the image data captured by the second aircraft matches the second feature parameter of the target object. In this embodiment of the present invention, considering that the second aircraft obtains the second feature parameter of the target object so as to identify the target object, the second feature parameter is mainly used to represent overall and/or local details of the target object. For example, the second feature parameter is a parameter used to indicate a parameter of a detail feature of the target object. In other embodiments, the first feature parameter of the target object that is obtained by the first aircraft is the same as the second feature parameter of the target object that is obtained by the second aircraft, thereby representing the overall outline of the target object as well as the overall and/or local details of the target object.

The location information may be longitude and latitude location information based on a global positioning system (GPS) or longitude and latitude location information based on a BeiDou navigation satellite system (BDS).

In the tracking and identification method provided in this embodiment of the present invention, the first aircraft in the predetermined high-altitude area and the second aircraft in the predetermined low-altitude area form high-low altitude cooperation and are respectively configured to track and identify the target object. When the image data captured by the first aircraft does not match the first feature parameter of the target object, the first aircraft is adjusted to the predetermined high-altitude area relative to the target object according to the location information of the second aircraft that is sent by the second aircraft or the location information of the target object, thereby implementing transfer of location information between two or more aircrafts as well as, positioning, tracking and identifying the target object.

Figure 2:
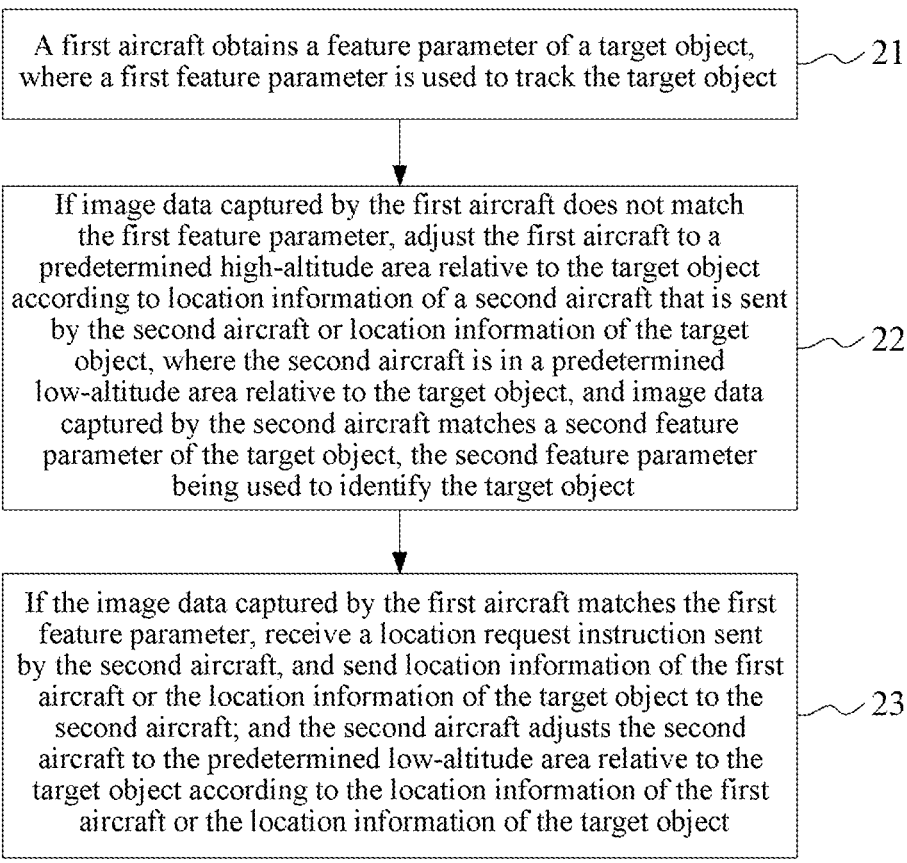
FIG. 2 shows a tracking and identification method according to another embodiment of the present invention.

FIG. 2 shows a tracking and identification method according to another embodiment of the present invention. As shown in FIG. 2, the method includes the following steps.

Step 21: A first aircraft obtains a feature parameter of a target object, where a first feature parameter is used to track the target object. The first feature parameter is mainly used to represent an overall outline of the target object. For example, the first feature parameter is a parameter used to indicate an appearance outline of the target object.

Step 22: If image data captured by the first aircraft does not match the first feature parameter, adjust the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

In this embodiment of the present invention, the second aircraft obtains the second feature parameter of the target object. The second feature parameter is mainly used to represent overall and/or local details of the target object. For example, the second feature parameter is a parameter used to indicate a parameter of a detail feature of the target object.

Step 23: If the image data captured by the first aircraft matches the first feature parameter, receive a location request instruction sent by the second aircraft, and send location information of the first aircraft or the location information of the target object to the second aircraft; and the second aircraft adjusts the second aircraft to the predetermined low-altitude area relative to the target object according to the location information of the first aircraft or the location information of the target object.

In other embodiments, if the image data captured by the first aircraft matches the first feature parameter, the first aircraft is set in the predetermined high-altitude area relative to the target object, to maintain the first aircraft in the predetermined high-altitude area, ensuring that the image data captured by the first aircraft matches the first feature parameter.

In this embodiment of the present invention, if the image data captured by the second aircraft does not match the second feature parameter, the second aircraft sends the location request instruction, the first aircraft sends the location information of the target object to the second aircraft according to the location request instruction sent by the second aircraft, and the second aircraft adjusts the second aircraft to the predetermined low-altitude area relative to the target object according to the location information of the target object.

Alternatively, the first aircraft sends the location information of the first aircraft to the second aircraft according to the location request instruction sent by the second aircraft, and the second aircraft adjusts the second aircraft to the predetermined low-altitude area relative to the target object according to the location information of the first aircraft. Specifically, the second aircraft adjusts the second aircraft to the predetermined low-altitude area relative to the target object according to the location information of the first aircraft and the location information of the target object that is determined by the first aircraft.

The second aircraft can photograph the target object in the predetermined low-altitude area, and overall and/or local details of the target object in a captured image are relatively clear, to satisfy that the image data captured by the second aircraft matches the second feature parameter.

In actual invention, in at least two situations, the image data captured by the second aircraft does not match the second feature parameter. Specifically, in a first situation, the second aircraft losses the target object, and the target object does not appear in an image captured by the second aircraft. In a second situation, although the target object appears in the image captured by the second aircraft, overall and/or local details of the target object in the image captured by the second aircraft are excessively vague.

It should be noted that after the first aircraft receives the location request instruction sent by the second aircraft, a precondition of sending the location information of the first aircraft or the location information of the target object according to the location request instruction is that the first aircraft is in the predetermined high-altitude area relative to the target object, and the image data captured by the first aircraft matches the first feature parameter of the target object. In addition, execution sequences of step 22 and step 23 may be switched according to actual situations.

Refer to related explanations and descriptions in the embodiments shown in FIG. 1 and FIG. 2. An embodiment of the present invention further provides a tracking and identification method. The method includes the following steps.

A second aircraft obtains a second feature parameter of a target object, where the second feature parameter is used to identify the target object.

If image data captured by the second aircraft does not match the second feature parameter, the second aircraft is adjusted to a predetermined low-altitude area relative to the target object according to location information of a first aircraft that is sent by the first aircraft or location information of the target object, where the first aircraft is in the predetermined low-altitude area relative to the target object, and image data captured by the first aircraft matches a first feature parameter of the target object, the first feature parameter being used to track the target object.

Further, if the image data captured by the second aircraft matches the second feature parameter, the method further includes:

setting the second aircraft in the predetermined low-altitude area relative to the target object.

Further, if the image data captured by the second aircraft matches the second feature parameter, the method further includes:

receiving a location request instruction sent by the first aircraft; and sending location information of the second aircraft or the location information of the target object to the first aircraft.

Figure 3:
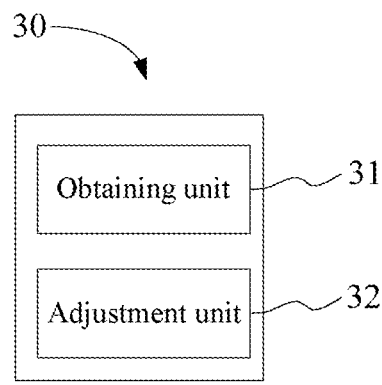
FIG. 3 is a schematic structural diagram of an aircraft according to an embodiment of the present invention.

FIG. 3 shows an aircraft 30 according to an embodiment of the present invention. The aircraft 30 is a first aircraft for tracking a target object. As shown in FIG. 3, the first aircraft includes an obtaining unit 31 and an adjustment unit 32.

The obtaining unit 31 is configured to obtain a first feature parameter of a target object, where the first feature parameter is used to track the target object.

The adjustment unit 32 is configured to, if image data captured by the first aircraft does not match the first feature parameter, adjust the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

In this embodiment of the present invention, the obtaining unit 31 obtains the first feature parameter of the target object. If image data captured by the first aircraft does not match the first feature parameter, the adjustment unit 32 adjusts the first aircraft to the predetermined high-altitude area relative to the target object according to the location information of the second aircraft that is sent by the second aircraft or the location information of the target object, so that the first aircraft can relatively clearly photograph an overall outline of the target object in the predetermined high-altitude area, to satisfy that the image data captured by the first aircraft matches the first feature parameter.

In actual invention, the obtaining unit 31 may be a photographing device such as a camera. The adjustment unit 32 may be a processor.

Figure 4:
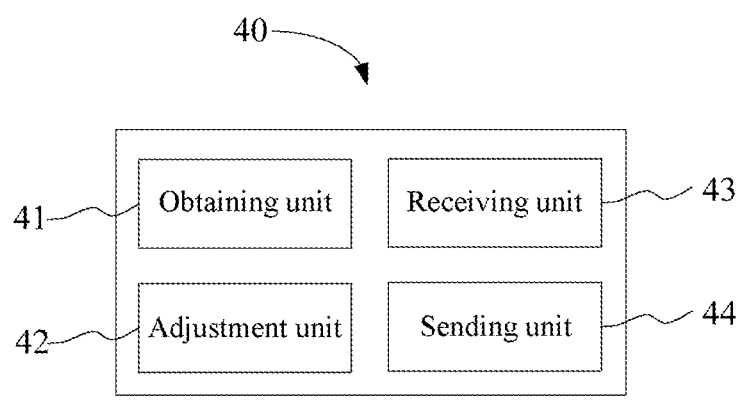
FIG. 4 is a schematic structural diagram of an aircraft according to another embodiment of the present invention.
Figure 5:
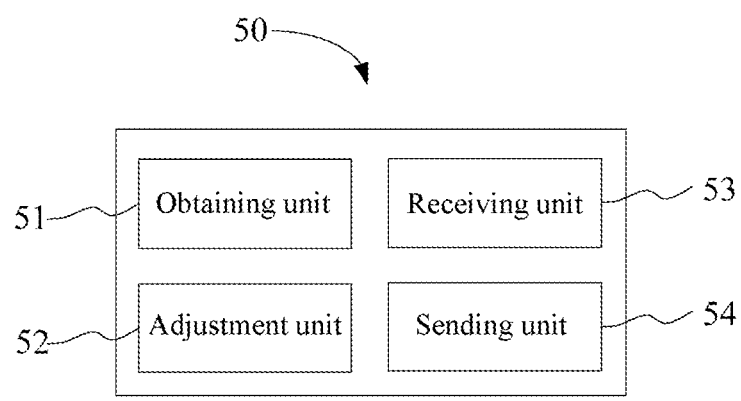
FIG. 5 is a schematic structural diagram of an aircraft according to another embodiment of the present invention.

FIG. 4 shows an aircraft 40 according to an embodiment of the present invention. The aircraft 40 is a first aircraft for tracking a target object. As shown in FIG. 4, the first aircraft includes an obtaining unit 41, an adjustment unit 42, a receiving unit 43, and a sending unit 44.

The obtaining unit 41 is configured to obtain a first feature parameter of a target object, where the first feature parameter is used to track the target object.

The adjustment unit 42 is configured to, if image data captured by the first aircraft does not match the first feature parameter, adjust the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

The receiving unit 43 is configured to receive a location request instruction sent by the second aircraft.

The sending unit 44 is configured to send location information of the first aircraft or the location information of the target object to the second aircraft.

In an implementation, if the image data captured by the first aircraft matches the first feature parameter, the first aircraft further includes a setting unit. The setting unit is configured to set the first aircraft in the predetermined high-altitude area relative to the target object, to maintain the first aircraft in the predetermined high-altitude area, ensuring that the image data captured by the first aircraft matches the first feature parameter.

In this embodiment of the present invention, the obtaining unit 41 obtains the first feature parameter of the target object. If image data captured by the first aircraft does not match the first feature parameter, the adjustment unit 42 adjusts the first aircraft to the predetermined high-altitude area relative to the target object according to the location information of the second aircraft that is sent by the second aircraft or the location information of the target object, so that the first aircraft can relatively clearly photograph an overall outline of the target object in the predetermined high-altitude area, to satisfy that the image data captured by the first aircraft matches the first feature parameter. If the image data captured by the first aircraft matches the first feature parameter, the receiving unit 43 receives the location request instruction sent by the second aircraft. The sending unit 44 sends the location information of the first aircraft or the location information of the target object to the second aircraft. Further, the second aircraft adjusts the second aircraft to the predetermined low-altitude area relative to the target object according to the location information of the first aircraft or the location information of the target object, so that the second aircraft can relatively clearly photograph the whole and/or details of the target object in the predetermined low-altitude area, to satisfy that the image data captured by the second aircraft matches the second feature parameter.

In actual invention, the adjustment unit 42, the receiving unit 43 and the sending unit 44 may be different processors or may be the same processor.

Referring to related explanations and descriptions in the embodiments shown in FIG. 3 and FIG. 4, an embodiment of the present invention further provides an aircraft 50. The aircraft 50 is a second aircraft for identifying a target object. The second aircraft includes an obtaining unit 51 and an adjustment unit 52.

The obtaining unit 51 is configured to obtain a second feature parameter of a target object, where the second feature parameter is used to identify the target object.

The adjustment unit 52 is configured to, if image data captured by the second aircraft does not match the second feature parameter, adjust the second aircraft to a predetermined low-altitude area relative to the target object according to location information of a first aircraft that is sent by the first aircraft or location information of the target object, where the first aircraft is in the predetermined low-altitude area relative to the target object, and image data captured by the first aircraft matches a first feature parameter of the target object, the first feature parameter being used to track the target object.

Further, if the image data captured by the second aircraft matches the second feature parameter, the second aircraft further includes a receiving unit 53 and a sending unit 54.

The receiving unit 53 is configured to receive a location request instruction sent by the first aircraft.

The sending unit 54 is configured to send location information of the second aircraft or the location information of the target object to the first aircraft.

In an implementation, if the image data captured by the second aircraft matches the second feature parameter, the second aircraft further includes a setting unit. The setting unit is configured to set the second aircraft in the predetermined low-altitude area relative to the target object, to maintain the second aircraft in the predetermined low-altitude area, ensuring that the image data captured by the second aircraft matches the second feature parameter.

It should be noted that because the tracking and identification method based on an aircraft and the aircraft are based on the same invention idea, corresponding technical content in method embodiments and in aircraft methods may be applicable to each other. Details are not provided herein.

Figure 6:
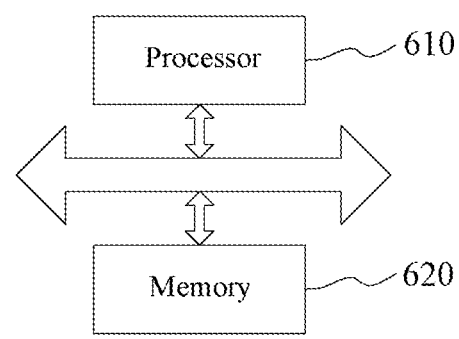
FIG. 6 is a schematic structural diagram of hardware of an aircraft according to an embodiment of the present invention.

FIG. 6 is a schematic structural diagram of hardware of an aircraft according to an embodiment of the present invention. The aircraft shown in FIG. 6 is a first aircraft for tracking a target object. As shown in FIG. 6, the aircraft includes one or more processors 610 and a memory 620. One processor 610 is used as an example in FIG. 6. The processor 610 is connected to the memory 620. The memory 620 stores an instruction that can be executed by the processor 610, the instruction being configured to execute:

obtaining a first feature parameter of a target object, where the first feature parameter is used to track the target object; and if image data captured by the first aircraft does not match the first feature parameter, adjusting the first aircraft to a predetermined high-altitude area relative to the target object according to location information of a second aircraft that is sent by the second aircraft or location information of the target object, where the second aircraft is in a predetermined low-altitude area relative to the target object, and image data captured by the second aircraft matches a second feature parameter of the target object, the second feature parameter being used to identify the target object.

Further, if the image data captured by the first aircraft matches the first feature parameter, the instruction is further configured to execute:

receiving a location request instruction sent by the second aircraft; and sending location information of the first aircraft or the location information of the target object to the second aircraft.

Figure 7:
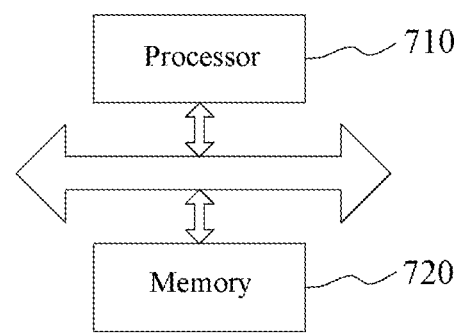
FIG. 7 is a schematic structural diagram of hardware of an aircraft according to another embodiment of the present invention.

As shown in FIG. 7, FIG. 7 is a schematic structural diagram of hardware of an aircraft according to an embodiment of the present invention. The aircraft shown in FIG. 7 is a second aircraft for identifying a target object. The aircraft includes one or more processors 710 and a memory 720. The processor 710 is connected to the memory 720. The memory 720 stores an instruction that can be executed by the processor 710, the instruction being configured to execute:

obtaining a second feature parameter of a target object, where the second feature parameter is used to identify the target object; and if image data captured by the second aircraft does not match the second feature parameter, adjusting the second aircraft to a predetermined low-altitude area relative to the target object according to location information of a first aircraft that is sent by the first aircraft or location information of the target object, where the first aircraft is in the predetermined low-altitude area relative to the target object, and image data captured by the first aircraft matches a first feature parameter of the target object, the first feature parameter being used to track the target object.

Further, if the image data captured by the second aircraft matches the second feature parameter, the instruction is further configured to execute:

receiving a location request instruction sent by the first aircraft; and sending location information of the second aircraft or the location information of the target object to the first aircraft.

It should be noted that as non-volatile computer readable storage media, the memory 620 and the memory 720 may be configured to store non-volatile software programs, non-volatile computer executable programs, and modules, such as a corresponding program instruction/unit (such as the obtaining unit 31 and the adjustment unit 32 shown in FIG. 3) for performing the tracking and identification method based on an aircraft in this embodiment of the present invention. The processor 610 and the processor 710 respectively correspondingly runs non-volatile software programs and instructions stored in the memory 620 and the memory 720, to execute various function inventions and data processing of a server, that is, implement the tracking and identification method based on an aircraft of the foregoing method embodiments.

The memory 620 and the memory 720 may include a program storage area and a data storage area, where the program storage area may store an operating system and an invention that is needed by at least one function; the data storage area may store data created according to use of the aircraft, and the like. In addition, the memory 620 and the memory 720 may include a high-speed random access memory, or may include a non-volatile memory such as at least one disk storage device, a flash storage device, or another non-volatile solid-state storage device. In some embodiments, optionally, the memory 620 and the memory 720 may include memories disposed remote from the processor 610 and the processor 710. These remote memories may be connected to the aircraft by using a network. Examples of the foregoing network include but are not limited to: the Internet, an intranet, a local area network, a mobile communications network, or a combination thereof.

The one or more modules are stored in the memory 620 or 720; when the one or more modules are executed by the one or more processors 610 or 710, the tracking and identification method based on an aircraft in any of the foregoing method embodiments is performed.

An embodiment of the present invention further provides a tracking and identification system. The system includes at least one first aircraft and at least one second aircraft.

The first aircraft is configured to obtain a first feature parameter of a target object, and the second aircraft is configured to obtain a second feature parameter of the target object, the first feature parameter being used to track the target object, and the second feature parameter being used to identify the target object.

If image data captured by the first aircraft does not match the first feature parameter, the first aircraft is adjusted to a predetermined high-altitude area relative to the target object according to location information of a second aircraft that is sent by the second aircraft or location information of the target object.

The second aircraft is in a predetermined low-altitude area relative to the target object, and image data captured by the second aircraft matches the second feature parameter of the target object.

If the image data captured by the first aircraft matches the first feature parameter, a location request instruction sent by the second aircraft is received, and location information of the first aircraft or the location information of the target object is sent to the second aircraft; and the second aircraft adjusts the second aircraft to the predetermined low-altitude area relative to the target object according to the location information of the first aircraft or the location information of the target object.

The foregoing product can perform the method provided in the embodiments of the present invention, and has corresponding functional modules for performing the method and beneficial effects. Refer to the method provided in the embodiments of the present invention for technical details that are not described in detail in this embodiment.

A Person skilled in the art may further realize that, in combination with the embodiments herein, units and algorithm, steps of each example described can be implemented with electronic hardware, computer software, or the combination thereof. To clearly describe the interchangeability between the hardware and the software, compositions and steps of each example have been generally described according to functions in the foregoing descriptions. Whether the functions are executed in a mode of hardware or software depends on particular inventions and design constraint conditions of the technical solutions. A Person skilled in the art can use different methods to implement the described functions for each particular invention, but it should not be considered that the implementation goes beyond the scope of the embodiments of the present invention. The computer software may be stored in a computer readable storage medium, and the program may include processes of embodiments of the foregoing methods when being executed. The storage medium may be a magnetic disk, an optical disc, a read-only memory, a random access memory, or the like.

The foregoing descriptions are merely optional embodiments of the present invention, but are not intended to limit the present invention. Any modification, equivalent replacement, or improvement made without departing from the spirit and principle of the present invention should fall within the protection scope of the present invention.

What is claimed is:

1. A tracking and identification method, comprising:
obtaining, by a first aircraft, a first feature parameter of a target object, wherein the first feature parameter is used to track the target object; and
if image data captured by the first aircraft does not match the first feature parameter, adjusting the first aircraft to a predetermined high-altitude area relative to the target object according to location information of a second aircraft that is sent by the second aircraft or location information of the target object, wherein
the second aircraft is in a predetermined low-altitude area relative to the target object, and image data captured by the second aircraft matches a second feature parameter of the target object, the second feature parameter being used to identify the target object.

2. The method according to claim 1, wherein if the image data captured by the first aircraft matches the first feature parameter, the method further comprises:
setting the first aircraft in the predetermined high-altitude area relative to the target object.

3. The method according to claim 2, wherein if the image data captured by the first aircraft matches the first feature parameter, the method further comprises:
receiving a location request instruction sent by the second aircraft; and
sending location information of the first aircraft or the location information of the target object to the second aircraft.

4. The method according to claim 1, wherein if the image data captured by the first aircraft matches the first feature parameter, the method further comprises:
receiving a location request instruction sent by the second aircraft; and
sending location information of the first aircraft or the location information of the target object to the second aircraft.

5. The method according to claim 4, wherein the method further comprises:
adjusting, by the second aircraft, the second aircraft to the predetermined low-altitude area relative to the target object according to the location information of the first aircraft or the location information of the target object.

6. The method according to claim 1, wherein the first feature parameter is used to indicate a parameter of an appearance outline of the target object, and the second feature parameter is used to indicate a parameter of a detail feature of the target object.

7. A tracking and identification system, comprising at least one first aircraft and at least one second aircraft, wherein
the first aircraft is configured to obtain a first feature parameter of a target object, and the second aircraft is configured to obtain a second feature parameter of the target object, the first feature parameter being used to track the target object, and the second feature parameter being used to identify the target object;
if image data captured by the first aircraft does not match the first feature parameter, the first aircraft is adjusted to a predetermined high-altitude area relative to the target object according to location information of the second aircraft that is sent by the second aircraft or location information of the target object; and
the second aircraft is in a predetermined low-altitude area relative to the target object, and image data captured by the second aircraft matches the second feature parameter of the target object.

8. The system according to claim 7, wherein if the image data captured by the first aircraft matches the first feature parameter, a location request instruction sent by the second aircraft is received, and location information of the first aircraft or the location information of the target object is sent to the second aircraft; and the second aircraft adjusts the second aircraft to the predetermined low-altitude area relative to the target object according to the location information of the first aircraft or the location information of the target object.

* * * * *